United States Patent [19]
Eden

[11] Patent Number: 6,144,512
[45] Date of Patent: Nov. 7, 2000

[54] DYNAMIC FILTER STRUCTURES

[75] Inventor: Dayton D. Eden, Dallas, Tex.

[73] Assignee: Lockheed Martin Corporation, Bethesda, Md.

[21] Appl. No.: 06/581,775

[22] Filed: Feb. 21, 1984

[51] Int. Cl.[7] .............................. G02F 1/03; G02B 5/30; G01S 13/89
[52] U.S. Cl. .................... 359/885; 359/350; 359/572; 359/584
[58] Field of Search ..................... 332/7.51; 350/322, 350/319, 311, 385, 1.1, 1.7; 372/99, 106; 455/616; 359/350, 572, 584, 885

[56] References Cited

U.S. PATENT DOCUMENTS

| | | | |
|---|---|---|---|
| 3,510,200 | 5/1970 | Gordon | 372/99 |
| 3,530,401 | 9/1976 | Garbury et al. | 372/99 |
| 3,617,938 | 11/1971 | Deville | 372/106 |
| 4,287,482 | 9/1981 | Wert | 372/99 |
| 4,372,653 | 2/1983 | Wert | 350/385 |
| 4,450,563 | 5/1984 | Bepca | 372/106 |
| 4,493,085 | 1/1985 | Valley | 372/99 |
| 4,513,421 | 4/1985 | Welch | 372/99 |
| 4,528,525 | 7/1985 | Eden et al. | 372/99 |

OTHER PUBLICATIONS

Danielewicz et al, "Hybrid Metal Mesh—Dielectric Mirrors . . . Lasers", Mar. 1976, pp. 761–767, Appl. Opt., vol. 15, No. 3.

Ulrich et al, "Variable Metal Mesh . . . Lasers", Nov. 1970, pp. 2511–2516, Appl. Opt., vol. 9, # 11, Copy in 372/99.

Jacobson et al, "Chemical Vapor . . . Chalcogenides . . . ", Aug. 25, 1983, pp. 57–64, vol. 428, Proc. SPIE Inst. Soc. Opt. Eng.

Eden et al, "Same Applications . . . $VO_2$", May 1979, pp. 97–102, Proc. Soc. Photo–Opt Inst. Eng., vol. 185.

Bugaev et al, Q Switching . . . "Metal–Semiconductor Phase Transition", Dec. 1981, pp. 1638–1639, Sov. J. Quant. Electron. vol. 11, No. 12.

Danielewicz et al, "Hybrid Output Mirrors . . . Lasers", Apr. 1975, pp. 366–369, Opt. Commun., vol. 13, #4.

*Primary Examiner*—Nelson Moskowitz
*Attorney, Agent, or Firm*—Sidley & Austin; Stephen Sadacca

[57] ABSTRACT

An electromagnetic wave interactive structure is provided for forming a transmitted electromagnetic wave response which is a function of the frequency of the incident wave. A phase transition material selected from the transition-metal oxides, dynamic nonlinear materials, the rare earth monochalcogenides and the organometallics is provided in geometric relationship with a fixed metallic structure. The phase transition material is then switched between a dielectric phase and a metallic phase to alter the response of the composite structure. Thus, an inductive mesh may be switched to a reflective surface (FIG. 8); an inductive band-pass changed to a reflective surface (FIG. 9); a capacitive band-stop response to an inductive band-pass response (FIG. 10); a capacitive band-stop response changed to a reflective surface (FIG. 11); a capacitive mesh response to an inductive band-pass response (FIG. 12); and a capacitive band-stop response switched to an inductive mesh response (FIG. 13). The ability to switch the response characteristics of an electromagnetic wave interactive structure provides useful applications in such devices as optical hardening systems, agile aperture devices and polarizing devices using bi-refringent structures.

29 Claims, 6 Drawing Sheets

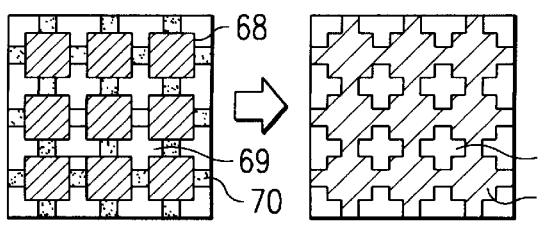
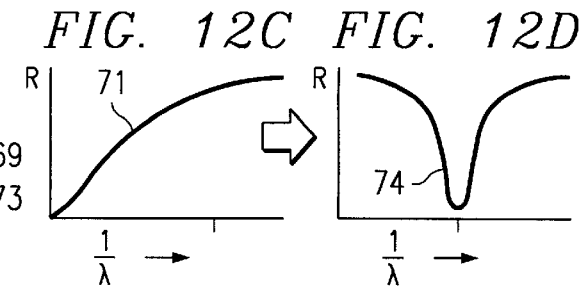
FIG. 12A  FIG. 12B  FIG. 12C  FIG. 12D
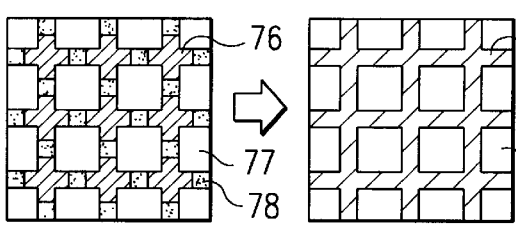
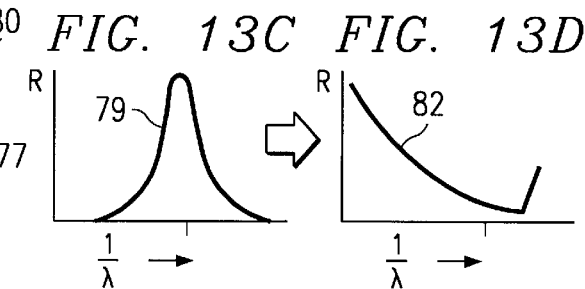
FIG. 13A  FIG. 13B  FIG. 13C  FIG. 13D
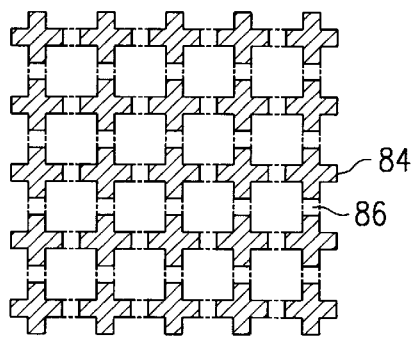
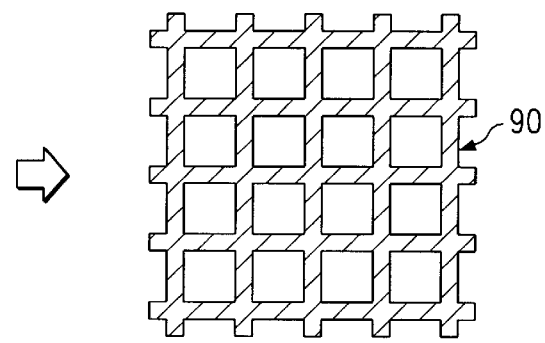
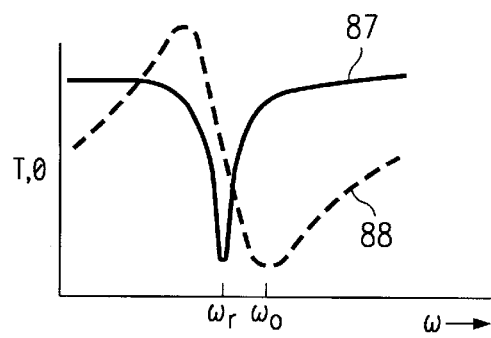
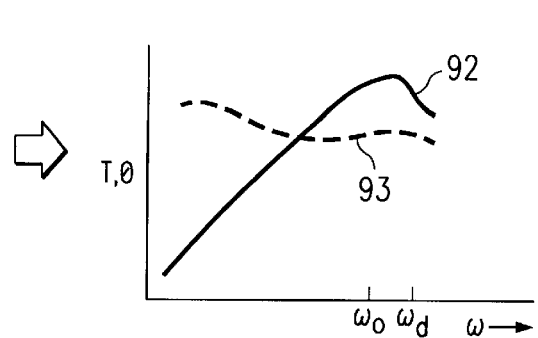
FIG. 14  FIG. 15

DYNAMIC FILTER STRUCTURES

TECHNICAL FIELD

This invention relates to dynamic electromagnetic wave filters and, more particularly, to thin film structures having switchable properties for dynamic interaction with incident electromagnetic radiation.

BACKGROUND ART

A variety of geometric filters are available consisting of fixed metallic and dielectric elements and having transmission and reflection characteristics as a function of wavelength for applied electromagnetic fields. In one basic design, a metallic mesh filter is provided for use in far-infrared optics, where wavelengths greater than 10.0 microns and frequencies below $3 \times 10^{13}$ Hz are involved. In such devices thin grids are provided having a thickness much less than the mesh width.

Metallic mesh filters may be formed as an inductive grid where the structure is formed in a metallic mesh. A complementary grid, or capacitive grid, may also be formed where metallic squares are supported in a symmetric pattern on a dielectric film. The characterization of such grid structures as inductive or capacitive is derived from the lumped circuit elements comprising an equivalent circuit for approximating the filter response.

Metallic grid filters generally obtain either high-pass or low-pass filtering with respect to the transmitted wave. Conventionally, a high-pass filter transmits frequencies with less attenuation near the diffraction edge of the mesh geometric structure.

Conversely, a low-pass filter provides greater transmission at frequencies corresponding to wavelengths less than the width of a metallic square. The basic theory of operation of such structures is well known, such as may be found in R. Ulrich, "Far-Infrared Properties of Metallic Mesh and Its Complementary Structure", 7 *Infrared Physics* 37 (1967).

Bandwidth filters, either band-pass or band-stop, have been made based on a cruciform geometry. A band-pass filter, an inductive element, generally includes a metallic surface defining cruciforms exposing a dielectric backing sheet. Again, a complementary pattern may be formed comprising metallic cruciform elements on a planar dielectric sheet. The complementary structure defines a band-stop filter, a capacitive structure, relative to the transmission of incident radiation. A basic discussion of bandwidth filters may be found in Tomaselli, et al., "Far-Infrared Band-Pass Filters from Cross-Shaped Grids", 20 *Applied Optic* 1361 (1981).

In addition to geometric structures which interact with electromagnetic waves, phase transition materials exist with variable properties, generally switchable between metal and dielectric properties, for interacting with electromagnetic waves. Thermochromic, or thermoptic, materials may be forced to undergo a phase transition from a material having dielectric, or wave transmitting, characteristics to a metallic conductor, or wave reflecting, characteristics. In some materials, the phase transition occurs when the material is heated or cooled and in other materials a phase transition occurs when selected materials are subjected to stress or to applied electromagnetic fields.

One particularly useful group of materials includes vanadium dioxide ($VO_2$) and other related vanadium transition films, and titanium oxides ($Ti_4O_7$). U.S. Pat. No. 4,283,113 teaches some other useful phase transition materials. Suitable phase transition materials may obtain a transmission of incident radiation of 95% in the dielectric state, reducing to a transmission of about 0.01% after being switched to a metallic reflecting element.

Other materials which exhibit transition properties between the dielectric and metallic states may be selected from the rare earth monochalcogenides and the organometallics. For example, the rare earth monochalcogenide samarium sulfide exhibits a phase transition when subjected to induced stresses. Organometallics, such as tetracyanoquinodimethane (TCNQ), exhibit phase transitions when subjected to an electromagnetic field.

There also exist semiconductor materials, particularly direct-gap semiconductors such as gallium arsenide (GaAs), which can be substantially transparent, or dielectric, for wavelengths corresponding to photon energies less than the band-gap energy. Wavelengths corresponding to photon energies above the band-gap energy (typically less than 1 micron) are strongly absorbed by the material. The band-gap energy can also be supplied by two photons of longer wavelength which arrive simultaneously and are absorbed, an event known as two photon absorption. Two photon absorption at these longer wavelengths can act to vary the optical properties of the material relating to absorption and refractive index where free carriers are generated by the photon absorption.

Also, other semiconductor materials such as indium antimonide (InSb), mercury cadmium telluride (HgCdTe), and the like, can obtain a plasma effect where free electrons and holes behave like mobile charge carriers. Below the so-called plasma frequency, the plasma appears metallic and totally reflective to incident radiation. Using such material, an optically bi-stable switch can be formed with operating speeds in the nanosecond range. A general discussion of exemplary materials may be found in Miller, "Dynamic Nonlinear optics in Semiconductors: Physics and Applications", *Laser Focus* (July, 1983).

Many useful structures may be formed from the above materials, generally in structures where the switching characteristics of the material between transmission and reflection may be directly useful. However, the useful frequency range may be determined by the material itself. Likewise, very high localized power must be provided to obtain responsive switching times over an area useful to form a shutter. For example, it is estimated that a $VO_2$ film of 5,000 angstroms thickness could require 10–15 Kw/cm$^2$ to obtain a 1 microsecond switching time.

Multilayer film structures using thin films with switchable characteristics have been proposed to provide optical structures with unique characteristics. However, it is difficult to predict the composite characteristics. Further, the fabrication yield of material meeting a given performance specification is low.

These and other difficulties in the prior art are overcome by the present invention, and an improved dynamic interactive structure using switchable elements in an array of fixed elements is provided.

SUMMARY OF THE INVENTION

According to one embodiment of the present invention, an electromagnetic wave interactive structure is provided with a first material which provides a first response from incident electromagnetic waves, a second material having a first material phase which also provides the first response from the incident electromagnetic waves and a second material phase which provides a second response from the electromagnetic waves. The first and second materials are arranged in a geometric structure which is effective to provide a first filter characteristic for the electromagnetic waves when the second material is in the first material phase and to provide a second filter characteristic when the second material is in the second material phase.

In yet another embodiment of the present invention, a thin film switchable grid is formed for effecting electromagnetic waves. A conductive grid is formed in a first filter configuration and a phase transition material is placed at locations spanning between selected portions of the conductive grid.

One embodiment of the present invention may be used in forming a phased array sensor where a plurality of the switchable grids is arranged in a parallel planar relationship. A change in the phase angle of the transmitted electromagnetic wave is effected through each of the grid structures and the phase angle changes may be selected to obtain a plurality of composite phase angle changes. A switching structure permits grid locations to be selectively addressed to form a portion of an agile sensor means for a stationary scanning system.

In yet another use for an embodiment of the present invention, a switchable imager element is provided in an optical hardening system wherein an inductive band-pass element is switchable to a reflecting surface when incident electromagnetic waves within the band-pass frequency increase to a predetermined intensity.

In yet another application of the present invention, a switchable bi-refringent structure is provided wherein a phase transition material permits a variable response for incident polarized electromagnetic waves.

One advantage of the present invention is to permit multiple performance characteristics from a single structure.

Another advantage is to obtain optical performance derived from the grid configuration and not the transition phase material characteristics.

Yet another advantage of the present invention is to permit precise discrete switching of the phase transition material.

Yet another advantage is to provide a relatively large area control by switching a relatively small area of phase transition material.

BRIEF DESCRIPTION OF THE DRAWINGS

FIG. 12 depicts a filter conversion from a capacitive mesh filter to an inductive band-pass filter.

FIG. 13 depicts a filter conversion from a capacitive band-stop filter to an inductive mesh filter.

FIG. 14 depicts a switchable band-stop filter with associated frequency response characteristics in transmission and phase angle.

FIG. 15 depicts a switchable high-pass filter with associated frequency response characteristics in transmission and phase angle.

DETAILED DESCRIPTION

In order to understand and appreciate the present invention, the following discussion relates to the performance characteristics of conventional grid-type structures. As herein used, "metal" means a material which is conductive of electrical charges and generally reflective of incident electromagnetic waves; "dielectric" means a material which is non-conductive of electrical charges and generally absorptive or transmittive of incident electromagnetic waves. A response of electromagnetic waves from interaction with a material will be either reflective or non-reflective. A non-reflective response may be either transmittive or absorptive, a transmittive response being the most common response investigated to date.

Figure 1:
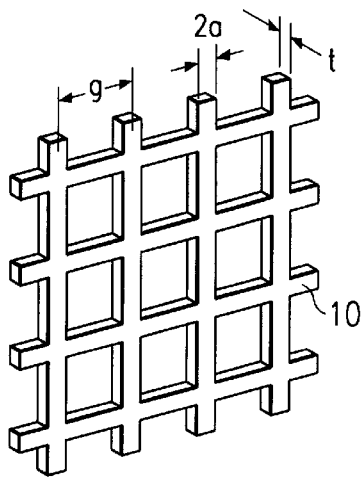
FIG. 1 is a representation of a conventional mesh filter having inductive response characteristics.
Figure 3:
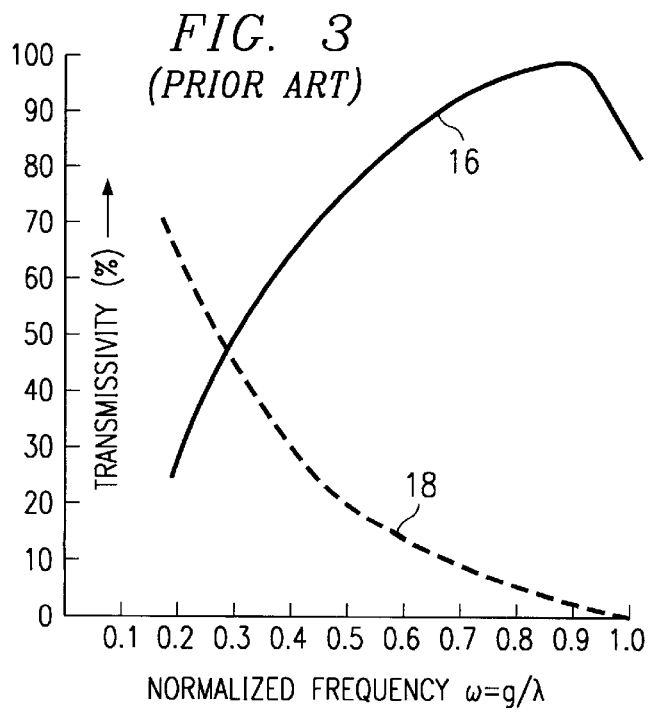
FIG. 3 depicts the transmission response characteristics as a function of a normalized frequency of the mesh filters of FIGS. 1 and 2.

FIG. 1 depicts an inductive mesh configuration which comprises a conductive grid 10 having a grid thickness, t, which is much less than the grid half width, a. Then, as depicted in FIG. 3, a high-pass filter characteristic response 16 is obtained having a transmission approaching 100% as the mesh spacing, g, approximates the incident wavelength. At yet higher frequencies, diffraction effects act to disperse the incident wave and reduce the transmission. Some suitable grid materials are nickel and copper.

Figure 2:
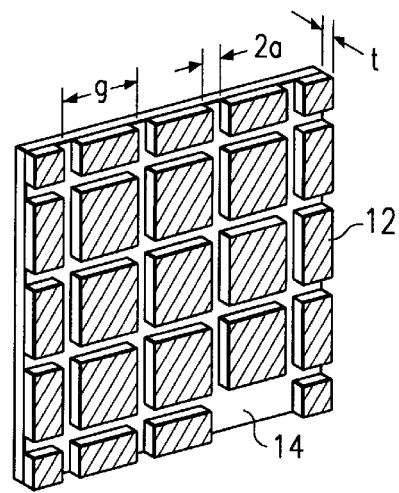
FIG. 2 is a representation of a conventional mesh filter having capacitive response characteristics.

Referring next to FIG. 2, there is shown a complementary capacitive mesh comprising conductive elements 12 on a supporting film 14, the structure defining a dielectric grid of supporting film 14 (a capacitive response is defined to be complementary to an inductive response). Response curve 18 shown in FIG. 3 has a characteristic exponential fall-off at higher frequencies corresponding to wavelengths greater than grid spacing, g. A suitable capacitive mesh may be formed of copper squares on various plastic films, such as polyethylene terphthalate having dielectric properties.

By way of example, the response characteristics depicted in FIG. 3 are based on structures shown in FIGS. 1 and 2 having the following mesh dimensions: g=368 microns and a/g=0.05.

Figure 4:
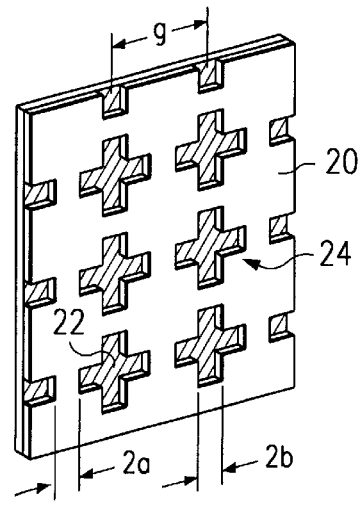
FIG. 4 is a representation of a conventional geometric filter having a band-pass response characteristic in transmission.

Referring now to FIG. 4, there may be seen an inductive cruciform structure. Conductive layer 20 defines cruciform holes 24 over an underlying dielectric film 22. The band-pass frequency response characteristics of the structure defined by FIG. 4 may be seen in FIG. 5. Typical structure dimensions are the following:

g=102 microns
a/g=0.06
b/g=0.14

Figure 5:
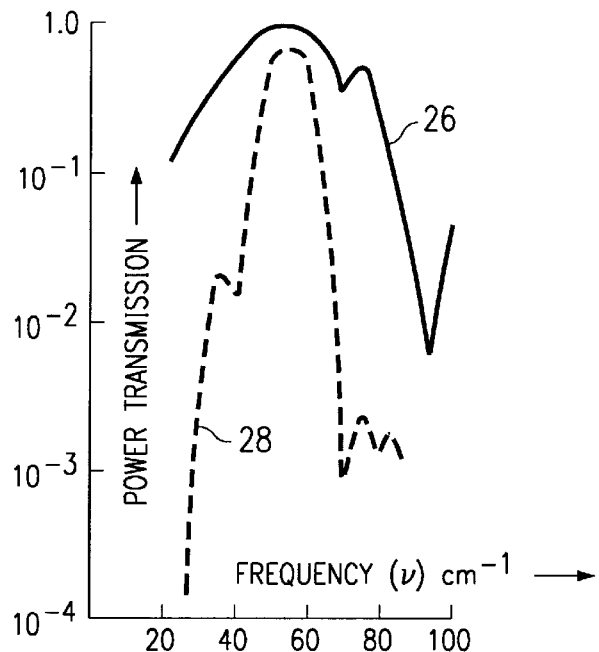
FIG. 5 illustrates a typical response characteristic of a filter according to FIG. 4.

The frequency scale shown in FIG. 5 consists of a wave number (number of waves per centimeter). The resonant frequency in cm$^{-1}$ may be roughly approximated as ½ the grid spacing, g, in microns.

As shown in FIG. 5, the inductive cruciform grid structure of FIG. 4 forms a band-pass filter in transmission having a relatively wide pass-band 26. Two band-pass filters may be formed in tandem to obtain response 28 having a more narrow band-pass characteristic.

Figure 6:
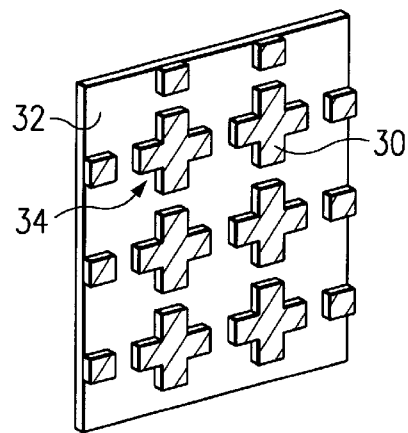
FIG. 6 is a representation of a conventional geometric filter having a band-stop response characteristic in transmission.

FIG. 6 depicts a capacitive grid structure which is complementary to the structure shown in FIG. 4. Metal cruciforms 30 are formed on dielectric support 32 with dimensions similar to the structure shown in FIG. 4. Dielectric support 32 predominates to define a basically transparent structure until a band-stop frequency defined by the cross arm dimensions of the metal cruciforms is reached. Within a defined bandwidth, the metal cruciforms act to reflect substantially all the incident radiation to form a band-stop filter.

Figure 7:
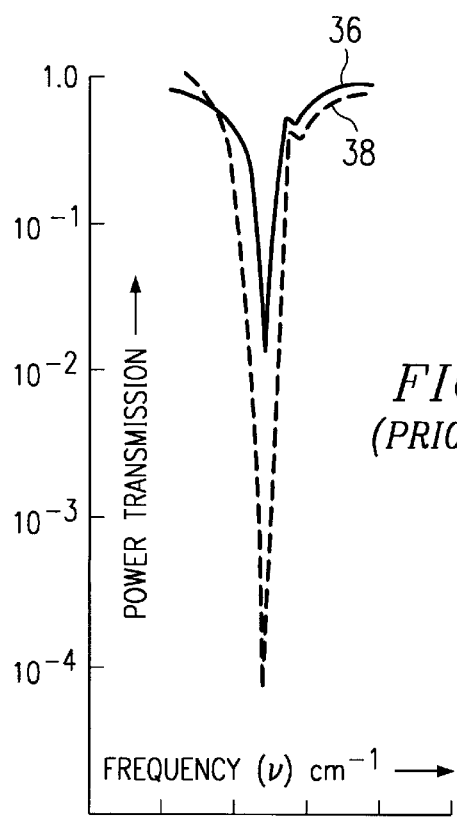
FIG. 7 illustrates a typical response characteristic of a filter according to FIG. 6.
Figure 8A:
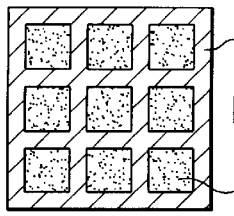
FIG. 8 depicts a filter conversion from an inductive mesh filter to a metallic reflector.
Figure 8B:
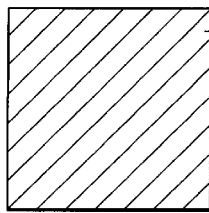
Figure 8C:
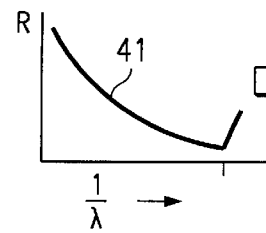
Figure 8D:
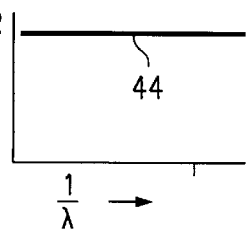
Figure 9A:
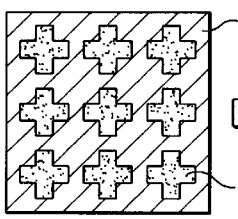
FIG. 9 depicts a filter conversion from an inductive band-pass filter to a metallic reflector.
Figure 9B:
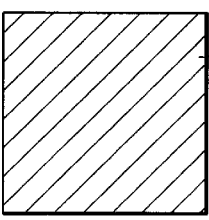
Figure 9C:
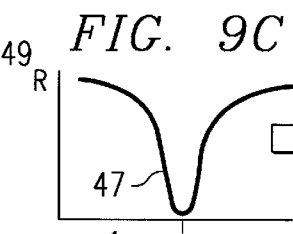
Figure 9D:
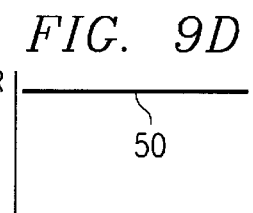
Figure 10A:
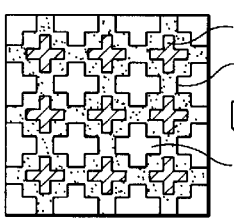
FIG. 10 depicts a filter conversion from a capacitive band-stop filter to an inductive band-pass filter.
Figure 10B:
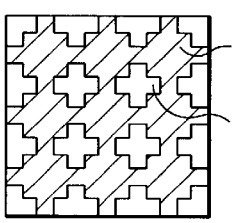
Figure 10C:
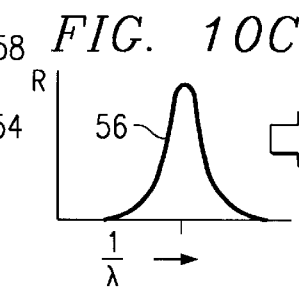
Figure 10D:
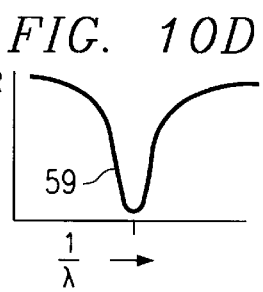

As shown in FIG. 7, the filter bandwidth is well defined. In this instance, arranging a pair of filters in tandem actually acts to broaden the bandwidth for the band-stop filter. However, the tandem arrangement depicted by curve 38 greatly increases the reflectance ratio at the operative frequency. In both FIGS. 5 and 7, there may be seen a maximum response, which occurs at about the center band frequency between the bandwidth response frequencies.

In the present invention, as hereinafter set forth, a material having electromagnetic wave properties switchable between dielectric or semiconductor and metal is placed in a geometric pattern with materials having one or more fixed electromagnetic wave interactive properties. This composite structure will typically be referred to as a switchable grid geometry, but without implying any limitation on the invention thereby. Placing a switchable element in a fixed structure permits the resulting structure to obtain many useful transformations; i.e., transparent-to-opaque, opaque-to-transparent, pure phase shifts, selectable phase shifts, as well as a variety of response variations hereinafter discussed.

The switchable material may be used only as a switch with the overall structure optical performance derived from the geometric design. This condition also permits large area structures to be controlled with relatively low power switching inputs. Further, the discrete switchable areas now permit the precise control of individual switchable elements, as well as beam-type switching presently used. The useful frequency range of the composite structure may be tailored to a wide spectrum of frequency requirements, from the millimeter (or radar) range, through the infrared (around 1 micron) to the visible optical spectrum, typically limited by microlithographic techniques for forming the grid patterns.

A variety of selected grid geometry changes are illustrated in FIGS. 8–13, columns A (initial geometry), B (switched geometry), C (initial response characteristic) and D (switched response characteristic). It will be appreciated that the response characteristics depicted in columns C and D are the reflection characteristics, which are opposite of the transmission characteristics in order to better illustrate the change in the response characteristics as the switchable material undergoes a phase transition from a dielectric to a metal. However, the filter characteristics will be described by their transmission properties, e.g., a "high-pass" filter in transmission will describe a "low-pass" characteristic in reflection.

As depicted in FIGS. 8–13, the switchable material may preferably be VO$_2$. In such structures, an interesting result may be observed, i.e., the resulting structure may undergo an interactive transition which is opposite to the transition of the VO$_2$ film. Thus, as the VO$_2$ material phase properties go from dielectric to metallic as the temperature increases beyond the transition temperature, the structure response may transition from metallic (reflective) to dielectric (non-reflective).

Referring now to FIGS. 8–13, there are illustrated a variety of thin film switchable structures. Referring first to FIG. 8, conductive grid 40 is formed on (or with) switchable films 42. This configuration shown in FIG. 8A defines the inductive high-pass response in FIG. 8C. As material 42 passes through the phase transition point, a planar metallic surface 43 is formed which is reflective at all frequencies as depicted in response 44, FIG. 8D.

In FIG. 9, switchable cruciforms 48 are defined through, or formed on, metallic conductive layer 46. Thus, band-pass filter response 47 is obtained, FIG. 9C. Again, as switchable material 48 passes through the phase transition, a planar metallic surface 49 is again formed having reflective response 50, FIG. 9D.

Figure 11A:
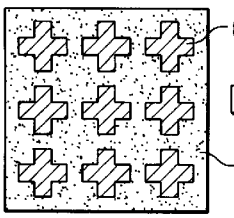
FIG. 11 depicts a filter conversion from a capacitive band-stop filter to a metallic reflector.
Figure 11B:
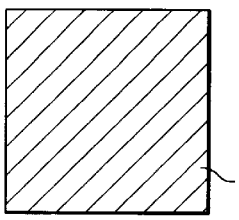
Figure 11C:
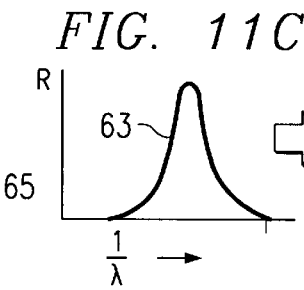
Figure 11D:
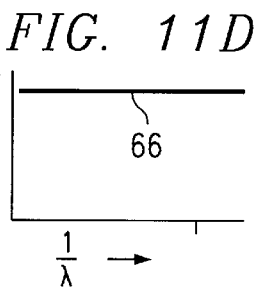

A more complicated response may be obtained from the composite structure depicted in FIG. 10 where metallic cruciforms 52 are formed on a fixed dielectric surface 54. Each metallic cruciform 52 is surrounded by small areas of switchable elements 53 defining cruciform areas of fixed dielectric material 54. The structure depicted in FIG. 10A forms a capacitive band-stop filter 56 shown at FIG. 10C. When switchable material 53 transitions to a metal, the resulting metal configuration defines inductive band-pass filter 10B having band-pass response 59, FIG. 10D. Similarly, FIG. 11 includes metallic cruciform 61 of switchable film area 62 having a capacitive band-stop response 63 (FIG. 11C). Metallic reflector surface 65, FIG. 11B, is formed having the reflective response 66, FIG. 11D, as the switchable material 62 transitions to a metal.

In FIGS. 12 and 13, there are illustrated two configurations where relatively small areas of switchable materials may be used to affect a large area response. FIG. 12A depicts metallic squares 68 with fixed dielectric cruciforms 69 therebetween with interconnecting switchable structures 70. The resulting structure is a low-pass capacitive grid having response 71, FIG. 12C. As switchable material 70 transitions to a metallic character, the resulting metallic configuration 73 (FIG. 12B) forms an inductive band-pass filter having a response 74 (FIG. 12D).

In FIG. 13, metallic cruciforms 76 are formed on fixed dielectric support 77 with switchable areas 78 interconnecting the arms of cruciform structures 76. The structure (FIG. 13A) forms a capacitive band-stop filter response 79, FIG. 13C. As switchable connecting area 78 transitions, inductive grid 80 is formed, FIG. 13B, having high-pass response 82, FIG. 13D.

The above figures are illustrative of the flexibility afforded by the present invention:

1. One grid configuration may be changed to its complement (FIG. 10);
2. A mesh configuration may be converted to a cruciform configuration (FIGS. 12 and 13);
3. A bandwidth response may be converted to a uniform response (FIGS. 8, 9 and 11).

The following materials have been found to undergo a phase transition in response to an externally applied forcing function:

1. Transition-metal oxides, such as $VO_2$ or $Ti_4O_7$, responsive to heating and cooling;
2. Dynamic nonlinear materials, such as InSb, HgCdTe or GaAs, responsive to photon and two photon absorptions;
3. Rare earth monochalcogenides, such as SmS, responsive to applied stress; and
4. Organometallics, such as CuTCNQ and AgTCNQ, responsive to applied electromagnetic fields.

It will be appreciated that a suitable material may be selected for a particular application considering the proposed geometric structure, electromagnetic field wavelength to be affected and suitable forcing function.

As hereinafter set forth in a few possible applications of the present invention, electronic structures may be provided which form large area shutters having fast shutter speeds, improved optical hardening switches may be provided with increased sensitivity and reduced switching times, self-scanning agile apertures may be provided for a wide frequency spectrum, and optical logic structures may be obtained. Further, the switchable forms may be thermochromic or thermoptic materials or may be a narrow band-gap semiconductor, may be selected from rare earth monochalcogenides or from organometallics, or other dynamic material capable of transitioning between a metal and a dielectric, as hereinabove discussed in the background section.

Referring now to FIGS. 14 and 15, there are shown metallic cruciforms 84 with switchable connectors 86 and having band-stop response 87. The change in transmission properties, however, also effects a change in the phase angle, $\phi$, of the transmitted wave, as illustrated in response curve 88. If $\omega_0$ represents an operating frequency and $\omega_r$ represents the center band of the band-stop response, it is apparent from FIG. 14 that phase angle $\phi$ at a given $\omega_0$ is determined by the proximity of $\omega_r$ to $\omega_0$. As hereinabove discussed, $\omega_r$ is a function of the grid geometry and, thus, cruciform 84 geometry may be selected to obtain the desired phase angle change between the incident wave and the transmitted wave.

When switchable areas 86 (FIG. 14) transition, metallic mesh 90 (FIG. 15) is obtained forming an inductive grid. The respective high-pass transmission characteristic and accompanying phase angle are shown in response curves 92 and 93, respectively. The designation $\omega_0$ represents the selected operating frequency, as hereinabove defined. A diffraction frequency limitation, $\omega_r$, is provided to prevent dispersion of the incident signal. Phase angle, $\phi$, is now relatively constant over the frequency range and at least up to the onset of the diffraction effects.

Thus, it may be seen from FIGS. 14 and 15 that the capability for switching the filter geometry yields an ancillary capability to change the phase of a transmitted wave at a given operating frequency $\omega_0$. If an appropriate operating frequency is selected relative to $\omega_r$ then a phase angle change may be obtained with no significant change in transmission.

Figure 16:
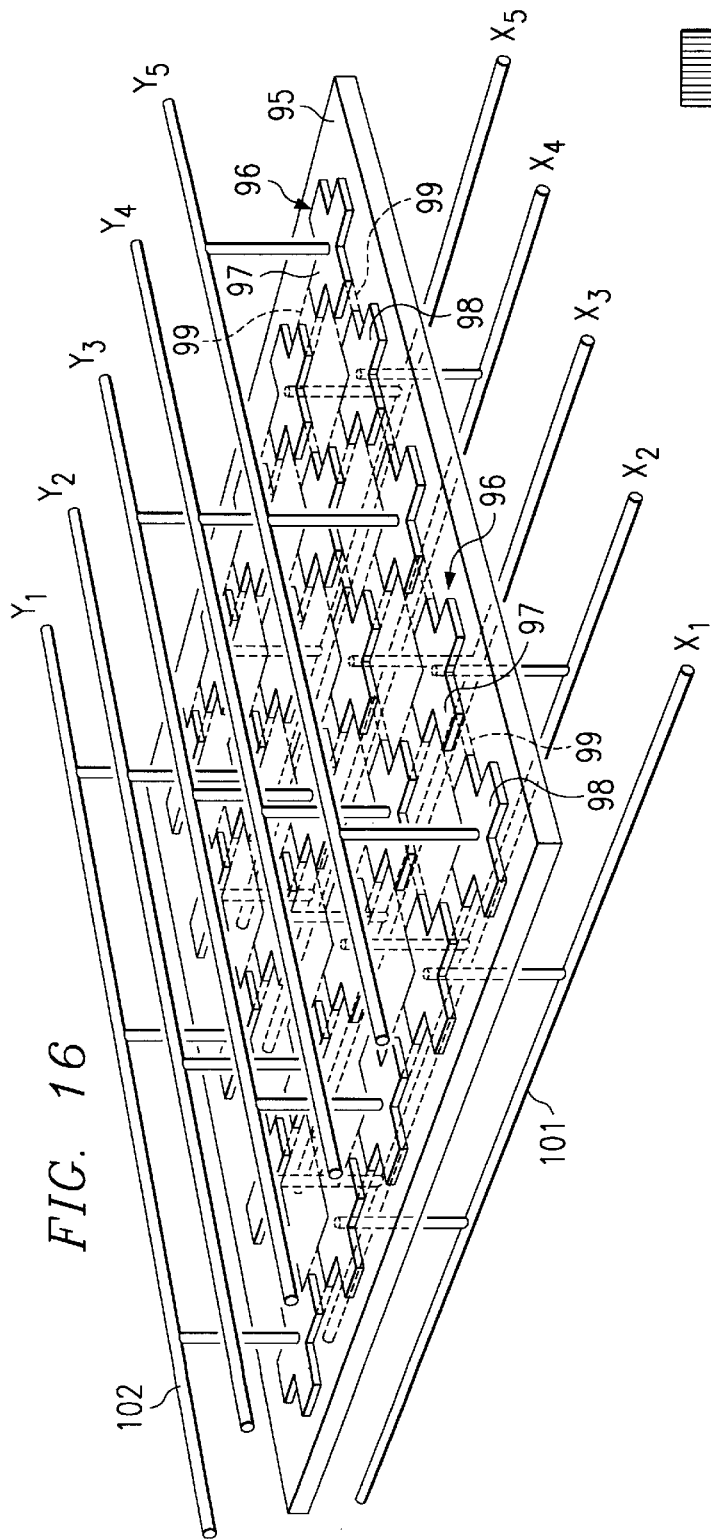
FIG. 16 depicts an addressable switchable array.

A switchable array is depicted in FIG. 16 for forming the transition from a band-stop filter to a high-pass filter, but more particularly for obtaining a selectable phase angle change without transmitted signal loss. Metallic cruciforms 96 are formed on support film 95. Arms 97 and 98 of adjacent cruciforms 96 are formed in facing relationship with switchable connector 99 therebetween. The array structure of FIG. 16 is generally formed as depicted in FIG. 14.

A selected metallic cruciform 96 may be activated through the connected X-address wiring 101 or the Y-address wiring 102. By way of example from FIG. 16, activating address lines $X_4$ and $Y_5$ creates a potential difference between cruciform arms 98 and 97 and across switchable connector 99. The resulting current flow within switchable connector 99 is effective to cause a phase transition to occur at a selected location on the filter structure. It should also be appreciated that the X and Y address lines may themselves be configured to form an inductive mesh as a high-pass filter which is substantially invisible to the frequency range of interest.

In one application, the addressable structure depicted in FIG. 16 may be stacked with other identical structures to form an agile sensor array, i.e., an electronically steerable aperture. As hereinabove discussed, a selected phase shift may be obtained through an otherwise transparent structure by altering the cruciform geometry to shift $\omega_r$ with respect to the operating frequency, $\omega_0$. By way of example, if four structures are stacked in a parallel planar arrangement, a first phase shift may be obtained such that the phase shift through each adjacent succeeding structure is a multiple of the preceding phase shift, e.g., 2, 4, and 8, respectively, of the first phase shift. This selection of multiples would be responsive to a four-bit word such that 16 phase shifts may be selected from the structure.

Figure 17:
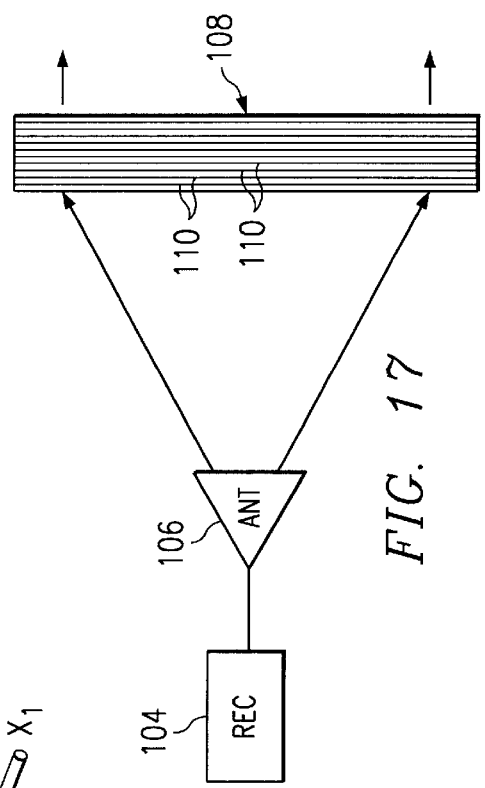
FIG. 17 depicts in block schematic an agile wave sensing device with dynamic filter steering.

Thus, as shown in FIG. 17, steerable aperture 108 may be formed from stacked addressable filters 110. Since the index of refraction for steerable aperture 108 is related to the composite phase shift, the phase shift can be varied in a selected pattern and in selected increments to steer incident radiation on aperture 108 at a selected angle to antenna 106. The detection angle is varied by phase shift commands to electronically sweep fixed antenna 106 over the area sought to be observed. Receiver 104 correlates the steering signal with the detected signal to provide a meaningful display.

Figure 18:
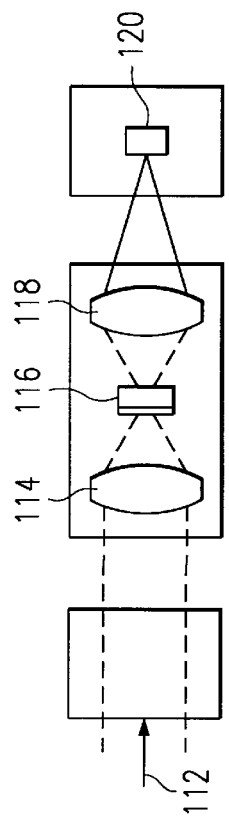
FIG. 18 depicts in block schematic an optical hardening system using a switchable array.

Yet another application is an improved optical hardening system, which is generically depicted in FIG. 18. Incident radiation 112 is directed to a first lens 114 to focal plate 116 at the focal plane of lens 114. The transmitted signal is then directed to second lens 118 for transmission and focus on radiation sensor 120. Focal plate 116 is provided to shield sensor elements 120 from damaging radiation, such as laser radiation.

Optical hardening devices exist where a focal plate 116 is formed of $VO_2$ which is generally transparent (dielectric) until heated by intense incoming radiation to transition to a reflective condition (metallic) which protects sensor 120. However, as hereinabove discussed, substantial power is required to obtain the material transition, particularly at high speeds.

However, a switchable inductive band-pass filter, such as depicted in FIG. 9, may be used to form focal plate 116. Then, all frequencies not in the band-pass region will always be reflected by the inductive filter. For radiation having frequencies within the band-pass region, the incident radiation is concentrated for transmission through the dielectric areas which form a relatively small percentage of the total area of focal plate 116. Thus, a small increase in incident radiation 112 can produce the power density at focal plate 116 to transition the dielectric to a reflective metallic condition to protect sensor 120. The enhanced power concentration not only increases the sensitivity of the device but also the switching speed to better protect sensor elements 120. Once the material has transitioned, the incident radiation is then spread over the entire reflective surface and the concentration is reduced below the damage level before damage can occur.

As herein described, the optical hardening system is a substantially passive switching and recovery device which protects sensitive sensor elements 120 against both in-band and out-of-band threats. Further, an improved dynamic range (damaging signal level/switching signal level) is obtained.

Figure 19A:
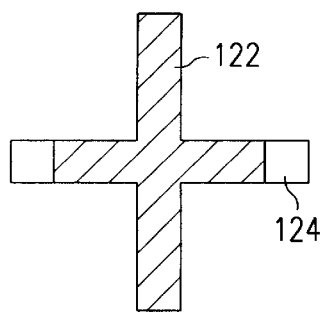
FIG. 19 depicts a bi-refringent structure with switchable horizontal polarization.
Figure 19B:
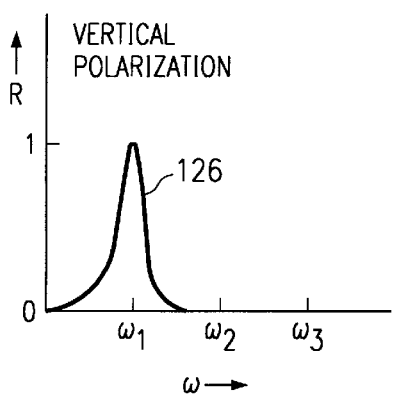
Figure 19C:
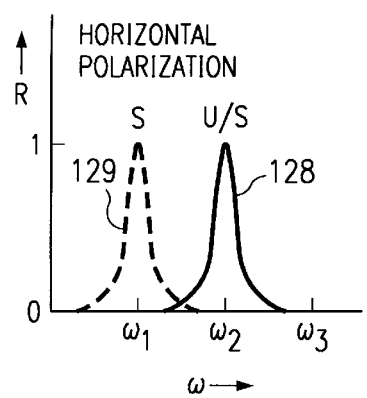
Figure 20A:
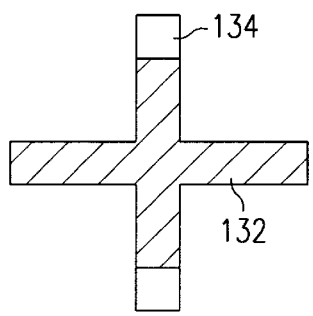
FIG. 20 depicts a bi-refringent structure with switchable vertical polarization.
Figure 20B:
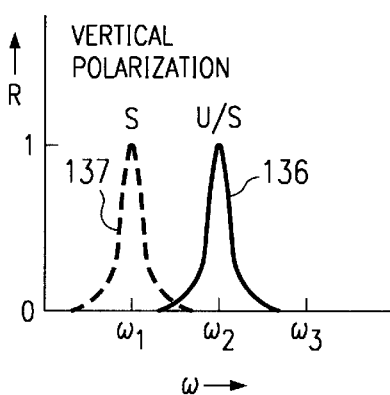
Figure 20C:
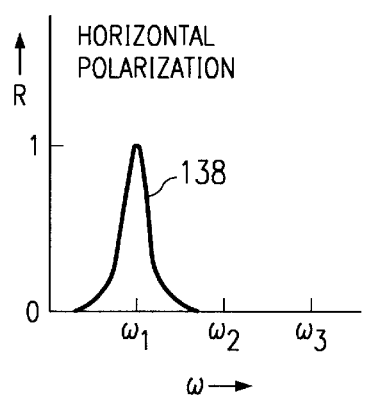

Yet another new and useful structure may be formed as a bi-refringent structure as depicted in FIGS. 19 and 20. A bi-refringent device may be formed from main elements 122 and 132, which may be either metallic or dielectric. Switchable areas 124 and 134 are connected with main elements 122 and 132, respectively. As hereinafter discussed, main elements 122 and 132 may be metallic cruciforms forming a capacitive band-stop filter as depicted in FIG. 6.

The cruciforms of FIGS. 19 and 20 have different lengths for the vertical and the horizontal cross arms of main elements 122 and 132. In this context, the terms "vertical" and "horizontal" are arbitrarily used to distinguish the two generally perpendicular cross arms of elements 122 and 132. The bandwidth center frequency of the band-stop is a function of the length of the cross arms. Thus, as shown in FIG. 19, the unswitched bi-refringent cruciform structure, FIG. 19A, has a fixed vertical polarization response 126 with a first bandwidth center frequency. The horizontal polarization responses 128 and 129 (FIG. 19C) may be obtained by transitioning switchable component 124 to alter the effective length of the horizontal cross arm of main element 122 and the corresponding bandwidth center frequencies.

In FIG. 20, switchable component 134 is formed on the vertical cross arm to obtain horizontal polarization responses 136 and 137 determined by the transition of switchable component 134. As shown in FIG. 20, the horizontal cross arm of main element 132 has a fixed response 138 to horizontally polarized incident radiation.

It will be apparent from FIGS. 19 and 20 that a composite structure may be formed with switchable components on both cross arms to obtain polarization characteristics alterable for both vertical and horizontal polarization. The resulting polarization filter can be activated to vary polarization of the transmitted wave from (a) linear to circular, (b) linear to orthogonal or (c) circular to linear as determined by a particular application or particular need of the user. The polarization mode can, however, be varied in a manner effective to enhance an incoming signal.

Figure 21:
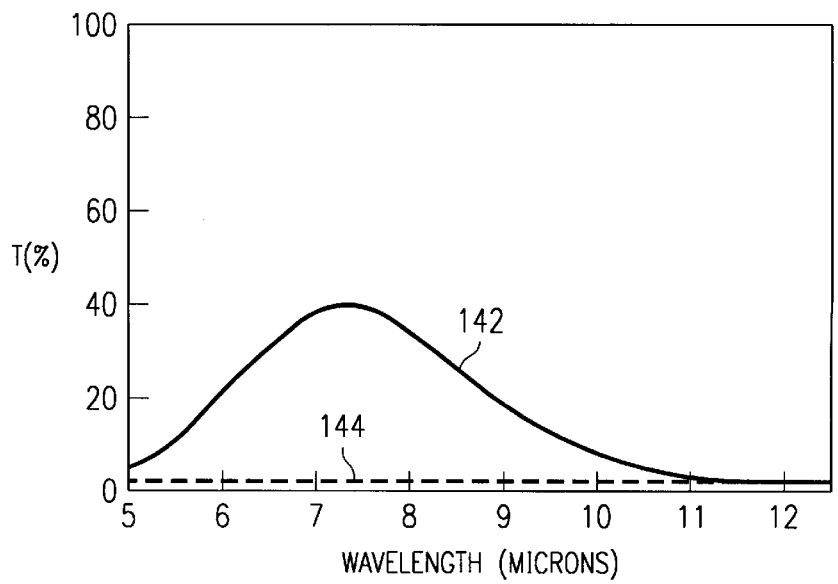
FIG. 21 shows experimental results for structure depicted in FIG. 9.

In FIG. 21, there is shown the response characteristic of an actual switchable inductive mesh having the configuration depicted in FIG. 9. A dielectric substrate was formed having $VO_2$ deposited on $CaF_2$. An overlying film of aluminum was then deposited and a crossed dipole slot pattern was formed in the aluminum to expose the underlying $VO_2$ using a two-level resist lift-off microlithographic process. The length of the cross arms (dimension g2a in FIG. 4) was about 1.70 micrometer and the aspect ratio ([g-2a]/2b in FIG. 4) was 5.5:1.

The response of the switchable mesh is shown in FIG. 21. In a cold-state, the exposed $VO_2$ was in the dielectric phase and inductive mesh characteristic 142 is exhibited for transmitting incident irradiation. In the hot-state, the exposed $VO_2$ transitions to a conductive material and substantially none of the incident light is transmitted as shown in characteristic 144. The light transmission response characteristics exactly correspond with the predicted characteristics, shown inversely as reflection characteristics in FIGS. 9C and 9D.

It is therefore apparent that the present invention is one well adapted to attain all of the objects and advantages hereinabove set forth together with other advantages which will become obvious and inherent from a description of the apparatus itself. It will be understood that certain combinations and subcombinations are of utility and may be obtained without reference to other features and subcombinations. This is contemplated by and is within the scope of the present invention.

As many possible embodiments may be made of this invention without departing from the spirit or scope thereof, it is to be understood that all matters herein set forth in the accompanying drawings are to be interpreted as illustrative and not in any limiting sense.

What is claimed is:

1. An electromagnetic wave interactive structure, comprising:

a first material providing a first response from incident electromagnetic waves;

a second material having a first phase providing said first response from said incident electromagnetic waves and a second phase providing a second response from said incident electromagnetic waves; and said first material and said second material forming a geometric grid switchable mesh filter structure effective to provide first mesh filter and reflectance characteristics relative to incident electromagnetic waves of a given frequency when said second material is in said first phase and second mesh filter and reflectance characteristics relative to incident electromagnetic waves of said given frequency when said second material is in said second phase, said geometric grid switchable mesh filter structure comprising means resonating with said incident electromagnetic waves of said given frequency in at least one of said first and second phases.

2. An electromagnetic wave interactive structure according to claim 1, wherein said second material is selected from a group consisting of transition-metal oxides, dynamic non-linear materials, rare earth monochalcogenides and organometallics having a reversible transition between a high reflectance response and a high transmission response from said incident electromagnetic waves.

3. An electromagnetic wave interactive structure according to claim 2, wherein said second filter characteristic is complementary to said first filter characteristic.

4. An electromagnetic wave interactive structure according to claim 2, wherein said first filter characteristic is defined by a mesh having said first response and said second filter characteristic is defined by a cruciform having said first response.

5. An electromagnetic wave interactive structure according to claim 2, wherein said first filter characteristic is a bandwidth response and said second filter characteristic is a uniform response.

6. An electromagnetic wave interactive structure according to claim 1, wherein said first response is a first phase angle of a transmitted portion of said electromagnetic waves functionally related to the frequency of said incident electromagnetic waves and said second response is a substantially constant second phase angle of said transmitted waves independent of said frequency of said incident waves.

7. An electromagnetic wave interactive structure according to claim 6, wherein a first said geometric structure is effective to define a first phase angle change between said first phase angle and said second phase angle.

8. An electromagnetic wave interactive structure according to claim 7, further including means for selectively switching said second material from said first phase to said second phase at discrete locations within said geometric structure.

9. An electromagnetic wave interactive structure according to claim 8, further including:

a plurality of said geometric structures in parallel planar relationship;

each of said geometric structures defining a phase angle change which is twice the phase angle change of an immediately preceding one of said geometric structures relative to incident electromagnetic waves; and said switching means connected with each of said geometric structures to define a plurality of discrete phase angle changes for converting a binary switching signal to a related phase angle change.

10. An electromagnetic wave interactive structure according to claim 1, wherein said first filter characteristic is a band-pass response and said second filter characteristic is substantially reflective.

11. An electromagnetic wave interactive structure according to claim 10, wherein said first material is a metal and said geometric structure includes a plane of said metal defining cruciform shapes containing said second material.

12. An electromagnetic wave interactive structure according to claim 11, wherein said incident electromagnetic waves transmitted by said band-pass response are effective to cause said second material to transition from said first phase to said second phase at a preselected minimum intensity of said incident waves.

13. An electromagnetic wave interactive structure according to claim 1, wherein said first filter characteristic is a bandwidth response having a first bandwidth center frequency for said incident electromagnetic waves with a first polarization and a second bandwidth center frequency for said incident electromagnetic waves with a second polarization.

14. A thin film switchable grid for affecting incident electromagnetic waves, comprising:

a conductive grid in a first filter configuration; and a phase transition material at locations spanning between selected portions of said conductive grid, and switchable between first and second phases, said conductive grid and phase transition material comprising a switchable geometric mesh filter structure for providing first mesh filter and reflectance characteristics relative to incident electromagnetic waves of a given frequency range when said phase transition material is in its first phase and second mesh filter and reflectance characteristics relative to incident electromagnetic waves of said given frequency range when said phase transition material is in its second phase, said switchable geometric mesh filter structure comprising means for resonating with incident electromagnetic waves of said given frequency range when said phase transition material is in at least one of said first and second phases.

15. A switchable grid according to claim 14, wherein:

said phase transition material is selected from a group consisting of transition metal oxides, dynamic non-linear materials, rare earth monochalcogenides and organometallics having a reversible transition between a dielectric first phase and a conductive second phase.

16. A switchable mesh according to claim 14 or 15, wherein:

said conductive grid in said first configuration and said spanning phase transition material obtain a switchable filter response from said electromagnetic waves functionally determined by said first and second phases of said phase transition material.

17. A switchable grid according to claim 16, wherein said switchable mesh filter response is from an inductive mesh to a reflective surface.

18. A switchable grid according to claim 16, wherein said switchable mesh filter response is from an inductive band-pass to a reflective surface.

19. A switchable grid according to claim 16, wherein said switchable mesh filter response is from a capacitive band-stop to an inductive band-pass.

20. A switchable grid according to claim 16, wherein said switchable mesh filter response is from a capacitive band-stop to a reflective surface.

21. A switchable grid according to claim 16, wherein said switchable mesh filter response is from a capacitive mesh to an inductive band-pass.

22. A switchable grid according to claim 16, wherein said switchable mesh filter response is from a capacitive band-stop to an inductive mesh.

23. A switchable grid according to claim 15, wherein:

said first filter configuration obtains a band-stop response with said phase transition material in said first phase having a center band frequency effective to produce a first predetermined phase angle in a transmitted portion of said electromagnetic wave at a selected operating frequency;

an inductive mesh response with said phase transition material in said second phase to produce a second phase angle in said transmitted portion of said electromagnetic wave at said selected operating frequency; and said band-stop response and said inductive mesh response having generally the same wave amplitude transmission response at said operating frequency.

24. A switchable grid according to claim 23, further including means for selectively switching from said first phase to said second phase at at least one of said locations having said phase transition material spanning between selected portions of said conductive grid.

25. A switchable grid according to claim 18, wherein said electromagnetic waves transmitted by said band-pass response are effective to cause said phase transition material to transition from said first phase to said second phase at a preselected minimum intensity of said incident waves.

26. A bi-refringent structure, comprising:

a main element having a vertical and a horizontal cross member; and a phase transition element for varying the effective length of at least one of said cross members for selectively affecting polarized electromagnetic waves and switchable between first and second phases, said main element and phase transition element comprising a switchable geometric mesh filter structure for providing first mesh filter and reflectance characteristics relative to incident electromagnetic waves of a given frequency range when said phase transition element is in its first phase and second mesh filter and reflectance characteristics relative to incident electromagnetic waves of said given frequency range when said phase transition element is in its second phase, said switchable geometric mesh filter structure comprising means resonating with incident electromagnetic waves of said given frequency range when said phase transition material is in at least one of said phases.

27. In an agile beam aperture system, a phased array sensor, comprising:

a plurality of switchable grids according to claim 24 arranged in parallel planar relationship;

each of said first filter configurations defining a change from said first phase angle to said second phase angle which is a preselected multiple of said change in an immediately preceding one of said switchable grids relative to incident electromagnetic waves; and said plurality of grids forming a plurality of discrete phase angle changes selected by said switching means to scan a selected area.

28. A phased array sensor according to claim 27, wherein said preselected multiple is two.

29. In an optical hardening system for protecting an optical sensing device, a switchable focal plane element comprising:

a thin-film switchable grid according to claim 16.

* * * * *

UNITED STATES PATENT AND TRADEMARK OFFICE
CERTIFICATE OF CORRECTION

PATENT NO.    : 6,144,512
DATED         : November 7, 2000
INVENTOR(S)   : Dayton D. Eden It is certified that error appears in the above-identified patent and that said Letters Patent is hereby corrected as shown below:

Column 11,
Line 60, (claim 16, line 1), delete "mesh", and insert -- grid --.
Line 64, (claim 16, line 4), after "switchable", insert -- mesh --.

Signed and Sealed this

Twenty-third Day of October, 2001

Attest:

*Nicholas P. Godici*

NICHOLAS P. GODICI
*Attesting Officer*    *Acting Director of the United States Patent and Trademark Office*